(12) United States Patent
Qin et al.

(10) Patent No.: US 8,755,138 B2
(45) Date of Patent: Jun. 17, 2014

(54) ADAPTIVE SERVO ADDRESS MARK DETECTION

(71) Applicant: LSI Corporation, San Jose, CA (US)

(72) Inventors: Dahua Qin, Allentown, PA (US); Haitao Xia, San Jose, CA (US); Xun Zhang, Westford, MA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/773,886

(22) Filed: Feb. 22, 2013

(65) Prior Publication Data

US 2014/0139939 A1    May 22, 2014

Related U.S. Application Data

(60) Provisional application No. 61/728,040, filed on Nov. 19, 2012.

(51) Int. Cl.
*G11B 5/00* (2006.01)

(52) U.S. Cl.
USPC .......................................... 360/49; 360/77.07

(58) Field of Classification Search
None
See application file for complete search history.

(56) References Cited

U.S. PATENT DOCUMENTS

| | | | |
|---|---|---|---|
| 7,929,238 | B1 | 4/2011 | Vasquez |
| 2011/0157737 | A1 | 6/2011 | Grundvig et al. |
| 2012/0106607 | A1 | 5/2012 | Miladinovic et al. |
| 2012/0124241 | A1 | 5/2012 | Yang et al. |

OTHER PUBLICATIONS

U.S. Appl. No. 13/491,135, Unpublished, filed Jun. 7, 2012, Xun Zhang.
U.S. Appl. No. 13/490,913, Unpublished, filed Jun. 7, 2012, Xun Zhang.

*Primary Examiner* — Wayne Young
*Assistant Examiner* — Brian Butcher
(74) *Attorney, Agent, or Firm* — Hamilton DeSanctis & Cha

(57) ABSTRACT

Various embodiments of the present inventions provide systems and methods for adaptive servo address mark detection.

20 Claims, 6 Drawing Sheets

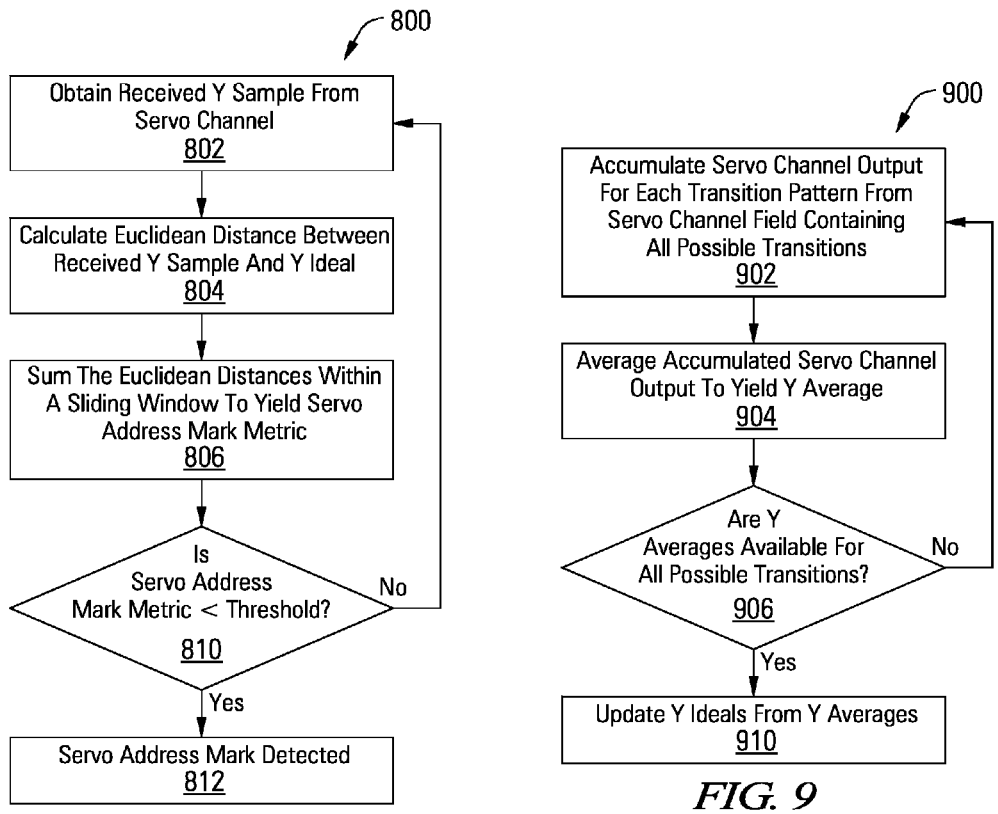
FIG. 8
FIG. 9
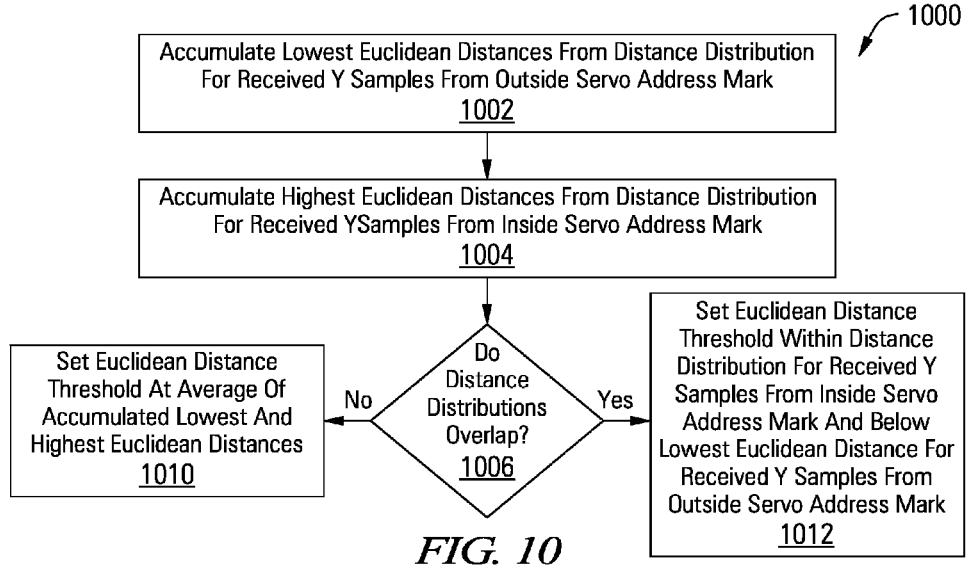
FIG. 10

ADAPTIVE SERVO ADDRESS MARK DETECTION

CROSS REFERENCE TO RELATED APPLICATIONS

The present application claims priority to (is a non-provisional of) U.S. Pat. App. No. 61/728,040, entitled "Adaptive Servo Address Mark Detection", and filed Nov. 19, 2012 by Qin et al, the entirety of which is incorporated herein by reference for all purposes.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned anew over the track as the storage medium is rotated. In this position, the previously stored magnetic flux pattern induces a current in the head assembly that can be converted to the previously recorded digital data.

A servo control system is used to move the read/write head assembly across the storage medium as the medium is rotated, and may also control the rotation speed and therefore the frequency at which servo data is read. The read/write head assembly must be positioned correctly by the servo control system to properly read stored data. Patterns stored in servo regions or servo wedges on the storage medium enable the servo control system to position the read/write head assembly. In some servo control systems, a Hamming detector is used to detect a servo address mark in the servo data. However, Hamming detectors have limited performance, particularly in asynchronous sampling detection systems.

BRIEF SUMMARY

Various embodiments of the present inventions provide systems and methods for adaptive servo address mark detection. Servo address marks are detected based on a Euclidean distance calculation between expected Y samples or Y ideals and received Y samples. The servo address mark pattern Y ideals define points in multidimensional space, and received Y samples define other points in the multidimensional space. When the distance between the Y ideals and the received Y samples is below a threshold, the servo address mark has been detected. The threshold is optimized in some embodiments to balance the distribution of servo address mark metric values when found, and the distribution of minimum servo address mark metric values in the servo data preamble. The Y ideals are calculated in some embodiments using an event based training algorithm to yield Y ideals as an average estimation. In some embodiments, the Y ideals are further averaged using a global averaging estimation.

This summary provides only a general outline of some embodiments according to the present inventions. Many other objects, features, advantages and other embodiments of the present inventions will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals may be used throughout several drawings to refer to similar components.

FIG. 8 is a flow diagram showing a method for adaptive servo address mark detection in accordance with some embodiments of the present inventions;

FIG. 9 is a flow diagram showing a method for calculating adaptive Y ideals in accordance with some embodiments of the present inventions;

FIG. 10 is a flow diagram showing a method for adapting a Euclidean distance threshold in accordance with some embodiments of the present inventions.

DETAILED DESCRIPTION OF THE INVENTION

Various embodiments of the present inventions provide systems and methods for adaptive servo address mark (SAM) detection, thereby facilitation the positioning of a sensor such as a read/write head in relation to a storage medium while transferring information to and from the storage medium. For example, a servo address mark may consist of a known pattern that is very different from the servo preamble in the servo data retrieved from a servo wedge on a storage medium such as a magnetic hard drive. When the read/write head is correctly positioned over the data track, the servo address mark can be detected to confirm that the read/write head is correctly positioned and to locate the desired data sector for reading or writing. The data pattern is read from the storage medium in some embodiments as an analog signal that is processed, amplified and digitized, yielding Y samples in which the servo address mark can be detected. Because the servo address mark is one of a number of known patterns, the servo address mark may be detected by calculating the distance between the actual or received Y samples and the expected Y samples or Y ideals. This calculated distance is a Euclidean distance in a multidimensional space, and when the distance between the Y ideals and the received Y samples is below a threshold, the servo address mark has been detected. The threshold can be adapted in some embodiments based on the center of two distributions, one being the distribution of Euclidean distances at the time when SAM is found, and the other being the distribution of minimum Euclidean distances over the servo preamble. The Y ideals are calculated in some embodiments using an event based training algorithm to yield Y ideals as an average estimation. In some embodiments, the Y ideals are further averaged using a global averaging estimation.

Figure 1:
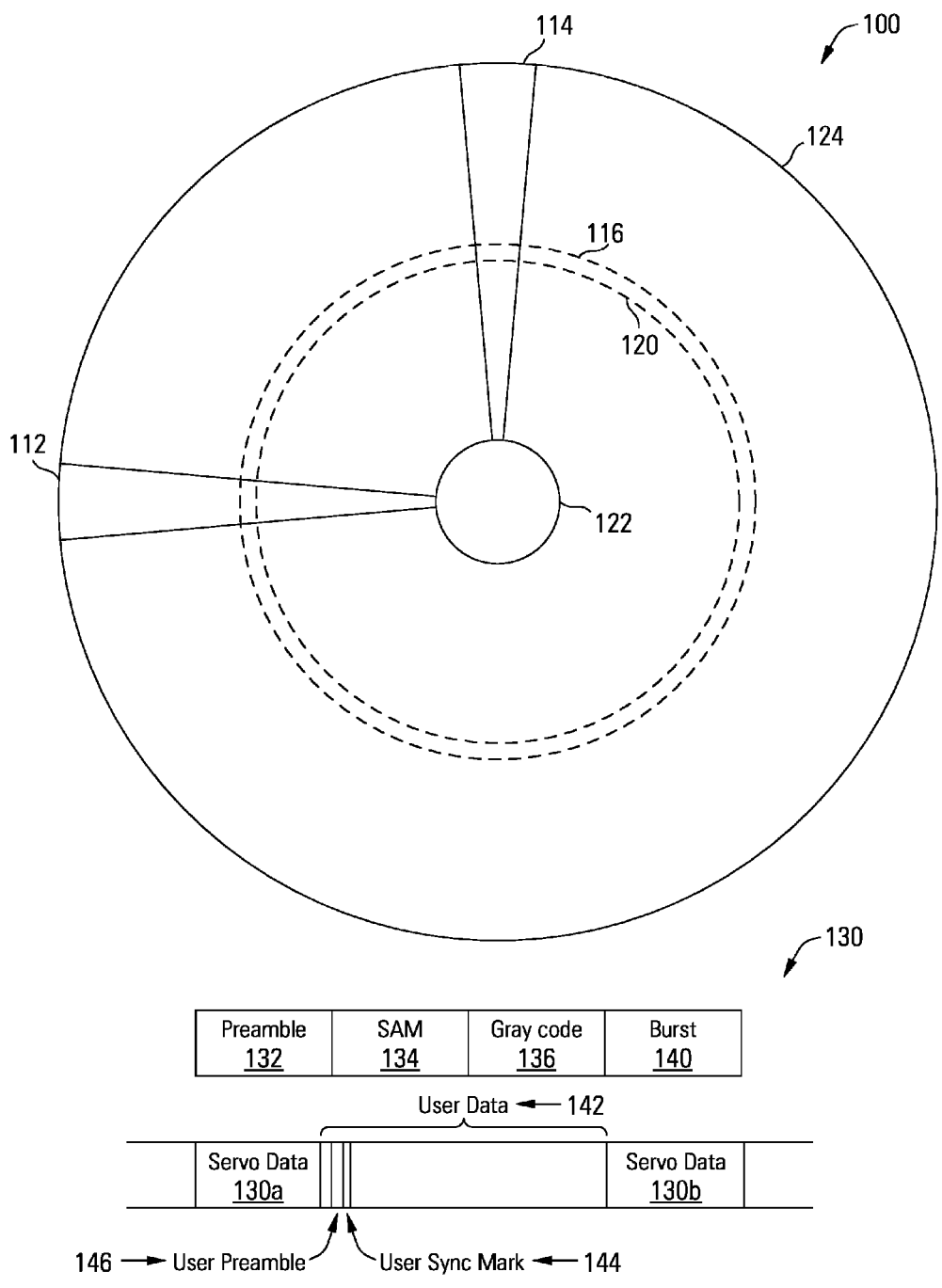
FIG. 1 depicts a diagram of a magnetic storage medium and sector data scheme with servo address marks in servo wedges in accordance with some embodiments of the present inventions.

Turning to FIG. 1, a magnetic storage medium 100 with servo wedges (e.g., 112, 114) containing servo data is depicted in accordance with one or more embodiments of the present inventions. Two exemplary data tracks 116, 120 are shown, indicated as dashed lines. The tracks 116, 120 are segregated by servo data written within wedges 112, 114.

The servo wedges 112, 114 may extend from an inner diameter 122 to an outer diameter 124, each with a single wedge shape, and with the width increasing all the way from inner diameter 122 to outer diameter 124, or the shape of each wedge may be adjusted to avoid becoming too wide at outer diameter 124. Servo wedges 112, 114 may have any suitable shape and arrangement, and any number of servo wedges may be provided on storage medium 100. It should be noted that while two tracks 116, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark 134. Servo address mark 134 is followed by a Gray code 136, and Gray code 136 is followed by burst information 140. It should be noted that a servo data set may have two or more fields of burst information. Further, it should be noted that different information may be included in the servo fields such as, for example, repeatable run-out (RRO) information that may appear after burst information 140.

Between the servo data bit patterns 130a and 130b, a user data region 142 is provided. User data region 142 may include one or more sets of data that are stored to storage medium 100. The data sets may include user synchronization information some of which may be used as a mark to establish a point of reference from which processing of the data within user data region 142 may begin.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

As used herein, the phrases "servo address mark" and "sync mark" are used in their broadest sense to mean any pattern that may be used to establish a point of reference. Thus, for example, a sync mark may be a user sync mark 144 as is known in the art. Based upon the disclosure provided herein, one of ordinary skill in the art may recognize other sync marks that could be used in relation to different embodiments of the present invention.

Figure 2:
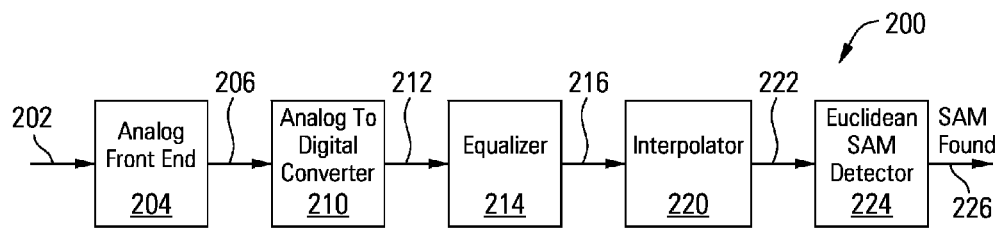
FIG. 2 is a block diagram of a servo channel with adaptive servo address mark detection in accordance with some embodiments of the present inventions.

Turning to FIG. 2, a block diagram depicts a servo channel 200 with adaptive servo address mark detection in accordance with some embodiments of the present inventions. Servo channel 200 includes an analog front end circuit 204 that receives an analog signal 202. Analog signal 202 may be, but is not limited to, a minute analog electrical signal derived from a read/write head assembly (not shown) that is disposed in relation to a storage medium (not shown). Based upon the disclosure provided herein, one of ordinary skill in the art will recognize a variety of sources from which analog input 202 may be derived. Analog front end circuit 204 processes analog signal 202 and provides a processed analog signal 206 to an analog to digital converter circuit 210. Analog front end circuit 204 may include, but is not limited to, an analog filter and an amplifier circuit as are known in the art. Based upon the disclosure provided herein, one of ordinary skill in the art will recognize a variety of circuitry that may be included as part of analog front end circuit 204.

Analog to digital converter circuit 210 converts processed analog signal 206 into a corresponding series of digital samples 212. Analog to digital converter circuit 210 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present inventions. Digital samples 212 are provided to an equalizer circuit 214. Equalizer circuit 214 applies an equalization algorithm to digital samples 212 to yield an equalized output 216. In some embodiments of the present inventions, equalizer circuit 214 is a digital finite impulse response filter circuit as are known in the art. In asynchronous sampling embodiments, an interpolator 220 interpolates between samples in the equalized output 216 to yield time-aligned samples in interpolated output 222 in order to align the received samples from analog signal 202 with the expected samples or Y ideals. Based upon the disclosure provided herein, one of ordinary skill in the art will recognize a variety of interpolation circuits that may be used in relation to different embodiments of the present inventions. A Euclidean servo address mark detector 224 detects the presence of one or more known servo address mark patterns in the received samples from analog signal 202 based on the calculated Euclidean distance between the received Y samples and the Y ideals, using adaptive Y ideals and adaptive distance threshold. The adaptive distance threshold specifies the maximum Euclidean distance between the received Y samples and the Y ideals under which the servo address mark is determined to be found. When the servo address mark is found in the received Y samples from the analog signal 202 by the Euclidean servo address mark detector 224, a servo address mark found output 226 is asserted.

Figure 3:
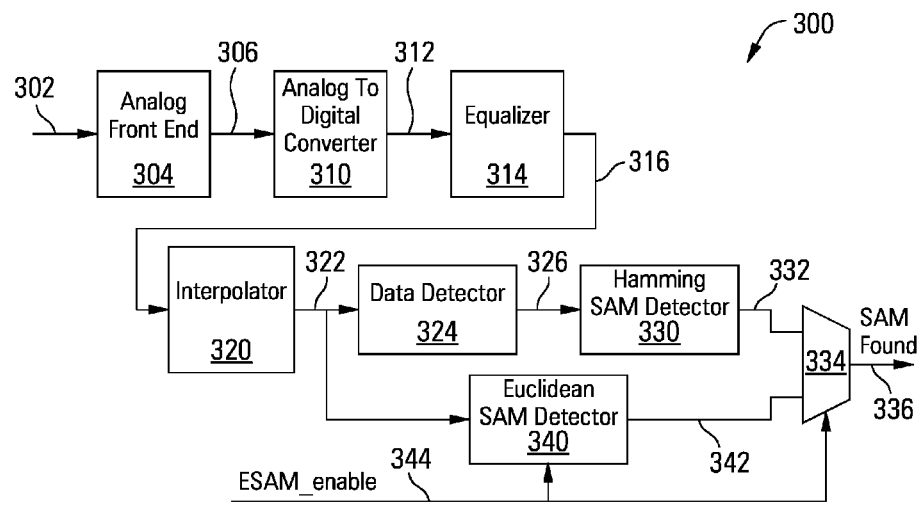
FIG. 3 is a block diagram of a servo channel with selectable adaptive servo address mark detection and Hamming servo address mark detection in accordance with some embodiments of the present inventions.

Turning to FIG. 3, a block diagram depicts a servo channel 300 with selectable adaptive servo address mark detection and Hamming servo address mark detection in accordance with some embodiments of the present inventions. Servo channel 300 includes an analog front end circuit 304 that receives an analog signal 302. Analog signal 302 may be, but is not limited to, a minute analog electrical signal derived from a read/write head assembly (not shown) that is disposed in relation to a storage medium (not shown). Based upon the disclosure provided herein, one of ordinary skill in the art will recognize a variety of sources from which analog input 302 may be derived. Analog front end circuit 304 processes analog signal 302 and provides a processed analog signal 306 to an analog to digital converter circuit 310. Analog front end circuit 304 may include, but is not limited to, an analog filter and an amplifier circuit as are known in the art. Based upon the disclosure provided herein, one of ordinary skill in the art will recognize a variety of circuitry that may be included as part of analog front end circuit 304.

Analog to digital converter circuit 310 converts processed analog signal 306 into a corresponding series of digital samples 312. Analog to digital converter circuit 310 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present inventions. Digital samples 312 are provided to an equalizer circuit 314. Equalizer circuit 314 applies an equalization algorithm to digital samples 312 to yield an equalized output 316. In some embodiments of the present inventions, equalizer circuit 314 is a digital finite impulse response filter circuit as are known in the art. In asynchronous sampling embodiments, an interpolator 320 interpolates between samples in the equalized output 316 to yield time-aligned samples in interpolated output 322 in order to align the received samples from analog signal 302 with the expected samples or Y ideals. Based upon the disclosure provided herein, one of ordinary skill in the art will recognize a variety of interpolation circuits that may be used in relation to different embodiments of the present inventions. A data detector 324 detects values in the interpolated output 322 to yield detected values 326. Data detector circuit 324 is operable to apply a data detection algorithm to a received codeword or data set. In some embodiments of the present inventions, data detector circuit 324 is a Viterbi algorithm data detector circuit as is known in the art. In other embodiments of the present inventions, data detector circuit 324 is a maximum a posteriori data detector circuit as is known in the art. Based upon the disclosure provided herein, one of ordinary skill in the art will recognize a variety of data detector circuits that may be used in relation to different embodiments of the present inventions. A Hamming servo address mark detector 330 searches for servo address marks in the detected values 326 and asserts a servo address mark found output 332 when found.

In parallel to or in place of the Hamming servo address mark detector 330, a Euclidean servo address mark detector 340 detects the presence of one or more known servo address mark patterns in the interpolated output 322 based on the calculated Euclidean distance between the received Y samples and the Y ideals, using adaptive Y ideals and adaptive distance threshold. The adaptive distance threshold specifies the maximum Euclidean distance between the received Y samples and the Y ideals under which the servo address mark is determined to be found. When the servo address mark is found by the Euclidean servo address mark detector 340, a servo address mark found output 342 is asserted. A switch or multiplexer 334 selects either the servo address mark found output 332 from the Hamming servo address mark detector 330 or the servo address mark found output 342 from the Euclidean servo address mark detector 340, based on the value of a Euclidean servo address mark enable signal 344. In some embodiments, the Euclidean servo address mark detector 340 may also be enabled and disabled by the Euclidean servo address mark enable signal 344.

In other embodiments, one or more other types of servo address mark detectors may be used in parallel with or in place of a Euclidean servo address mark detector 340 in place of the Hamming servo address mark detector 330 of FIG. 3.

Figure 4:
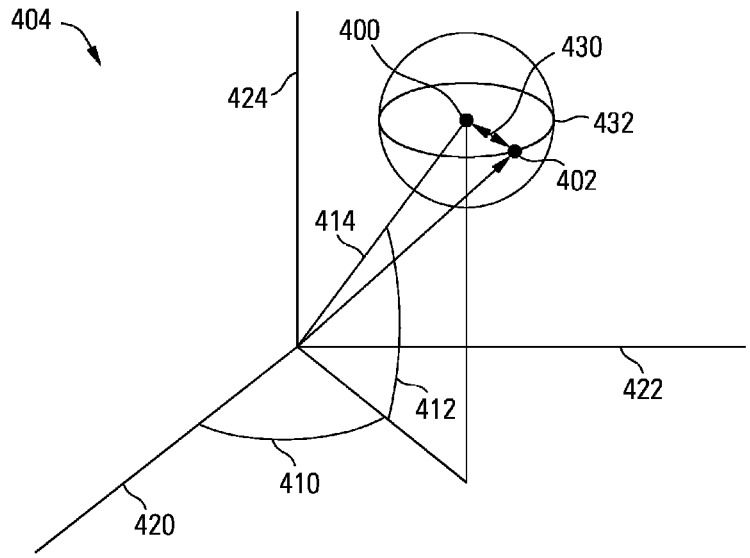
FIG. 4 is a diagram illustrating Euclidean distance between servo address mark pattern Y ideals and received Y samples during adaptive servo address mark detection in accordance with some embodiments of the present inventions.

Turning to FIG. 4, a Euclidean distance calculation is graphically depicted between a point 400 defined by received Y samples and a point 402 defined by Y ideals in a three-dimensional space 404. In this embodiment, the Y samples and Y ideals have three samples, thereby establishing a three-dimensional space 404. For example, the position of the received Y samples point 400 may be specified by angles theta θ 410, phi φ 412, and radius rho ρ 414 (each defined by one of the three samples in received Y samples), relative to axes x 420, y 422 and z 424. Notably, the multi-dimensional space 404 is not an intrinsic characteristic of the received Y samples or Y ideals in some embodiments, and is established by the adaption process on the Y ideals. The multi-dimensional space 404 is defined using adaptive Y ideals. Adaptive Y ideals can be interpreted as the axes 420, 422, 424 of the multi-dimensional space 404. Thus, the axes 420, 422, 424 of the multi-dimensional space 404 are not predefined, they are adapted for each operation, and for each storage device or disk drive they may be different.

Furthermore, the adaptive servo address mark detection is not limited to any particular number of dimensions in the multi-dimensional space 404. Given more samples in the received Y samples and Y ideals, there will be more dimensions in the multi-dimensional space 404. In some embodiments, the multi-dimensional space 404 has, but is not limited to, 36 or 48 dimensions. However, the three-dimensional embodiment of FIG. 4 is shown for ease in visualizing the Euclidean distance computation. To compute the Euclidean distance 430 between the received Y samples point 400 and the Y ideals point 402, the difference between the received Y samples and the Y ideals is squared and the result is accumulated to produce a servo address mark metric, according to Equation 1:

$$SAM \text{ metric} = \sum_{i=1}^{N} (y_i - yid_i)^2 \qquad (Eq\ 1)$$

where $y_i$ are the received Y samples, $yid_i$ are the Y ideals and N is the length of a sliding window over which the Euclidean distances between received Y samples and Y ideals are accumulated to yield a servo address mark metric. For example, if the received Y samples are +2, −2, +2, and the Y ideals are also +2, −2, +2, the square error computation for the Euclidean distance for each is 0, there is no error, and the accumulated error is also 0. The smaller the Euclidean distance between the received Y samples and the Y ideals, the higher the confidence that the received Y samples are taken from the servo address mark. The servo address mark metric according to Equation 1 may also be divided by the number of Euclidean distances within the sliding window. A threshold 432 sets the boundary under which the accumulated Euclidean distance or servo address mark metric indicates that the servo address mark is detected. In some embodiments, the threshold 432 is also adaptive, providing a small enough distance to prevent false detection but large enough to allow detection in the presence of channel noise.

In some embodiments, localized DC content is removed from the received Y samples before performing the Euclidean distance and servo address mark metric computation of Equation 1, according to Equation 2:

$$y'_i = y_i - DC = y_i - \left(\sum_{j=1}^{M} y_j\right) / M \qquad (Eq\ 2)$$

where $y'_i$ are the received Y samples with localized DC content removed, DC is the localized DC content, and M is the length of a sliding window over which the DC content is estimated and removed. In a magnetic hard disk drive, for example, a non-ideal magnetic read/write head assembly may produce a signal with a varying baseline, in other words an analog signal with a varying DC component or bias, which may be removed using an accumulator circuit implementing Equation 2. Based upon the disclosure provided herein, one of ordinary skill in the art will recognize a variety of accumulator circuits that may be used to implement Equation 2 in relation to different embodiments of the present inventions. The value M, or the length of the sliding window used to remove the DC content, may be shorter to give better response time in estimating the DC bias to be removed at the cost of reduced accuracy, or longer give more accurate estimation at the cost of a lower response time, thereby balancing latency and accuracy. A user-programmable register is provided in some embodiments to allow the sliding window length to be adjusted based on servo channel conditions.

Figure 5:
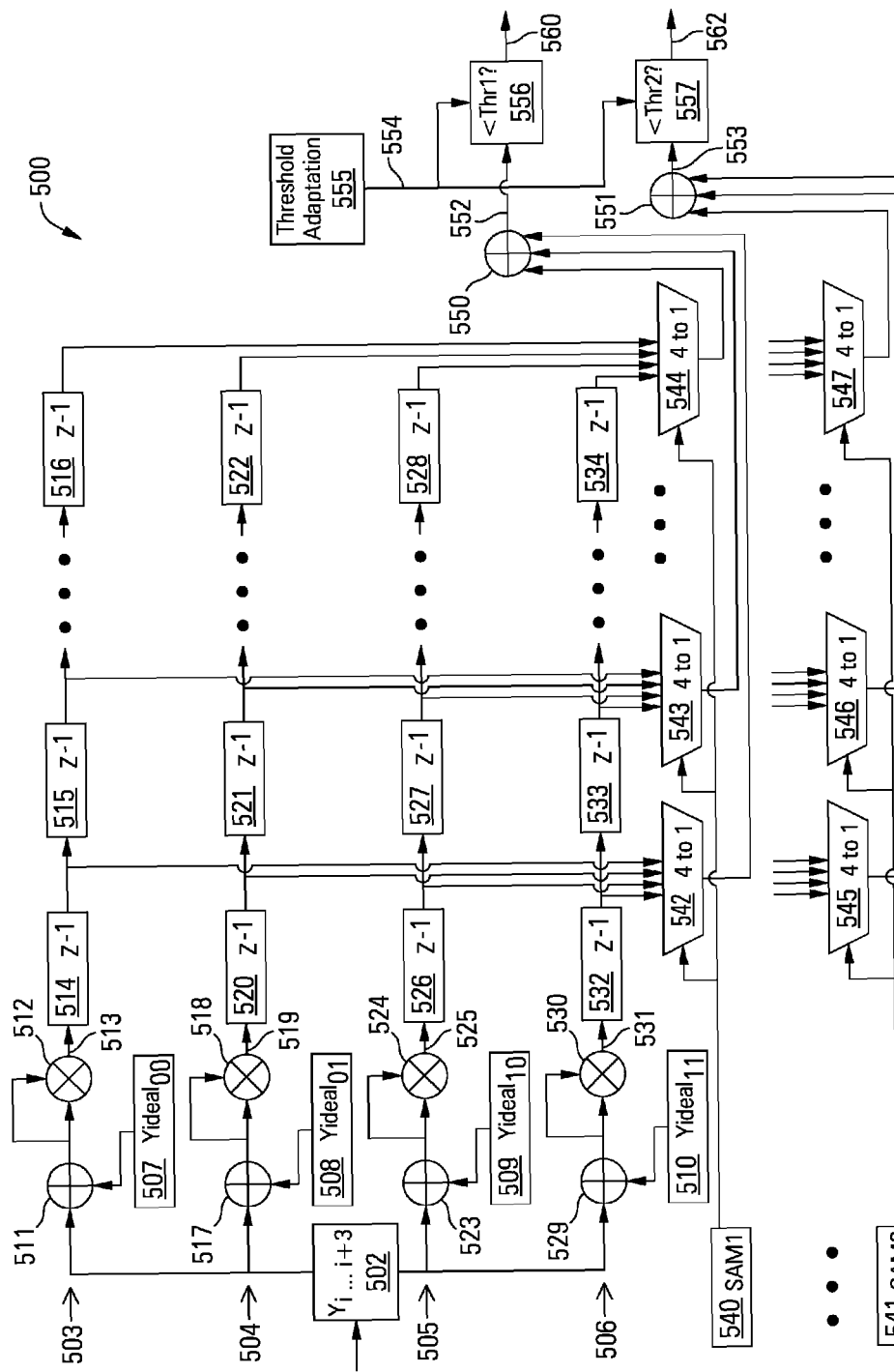
FIG. 5 is a block diagram of an adaptive servo address mark detector in accordance with some embodiments of the present inventions.

Turning to FIG. 5, an adaptive servo address mark detector 500 is depicted in accordance with some embodiments of the present inventions. In this embodiment, received Y samples are 4-bit samples resulting from wide bi-phase code encoding of each incoming bit. In some embodiments, the preamble pattern is a repeating pattern before the servo address mark such as, but not limited to, "0011", which if decoded by wide bi-phase code becomes a stream of repeated 1's. However, the adaptive servo address mark detector 500 is not limited to any particular width or format of received Y samples and corresponding Y ideals, or of servo data surrounding servo address marks.

The adaptive servo address mark detector 500 of FIG. 5 receives 4-bit received Y samples 502, which in this embodiment have four possible distance values and are thus processed in four distance calculation rows 503, 504, 505, 506. Each of the four distance calculation rows 503, 504, 505, 506 calculates the difference between the received Y samples 502 and one possible Y ideal value 507, 508, 509, 510, with the resulting difference squared and then delayed in a series of delay elements to implement a sliding window. The first possible Y ideal value 507 is subtracted from received Y samples 502 in row 503 using adder (or subtractor) 511, with the resulting different squared in multiplier 512 to yield a Euclidean distance 513. In some embodiments, multiplier 512 is implemented using a lookup table. One of ordinary skill in the art will recognize a number of multiplier and adder circuits and techniques that could be used in relation to different embodiments of the present invention. The Euclidean distance 513 is sequentially delayed in delay elements 514, 515, 516. Additional delay elements (not shown) are included depending on the length of the sliding window over which Euclidean distances are compared to generate the servo address mark metric.

This effectively performs the computation of Equation 1 for one possible Y ideal value 507. The second possible Y ideal value 508 is subtracted from received Y samples 502 in row 504 using adder 517, with the resulting different squared in multiplier 518 to yield Euclidean distance 519. The Euclidean distance 519 for the second possible Y ideal value 508 is sequentially delayed in delay elements 520, 521, 522. The third possible Y ideal value 509 is subtracted from received Y samples 502 in row 505 using adder 523, with the resulting different squared in multiplier 524 to yield Euclidean distance 525. The Euclidean distance 525 for the third possible Y ideal value 509 is sequentially delayed in delay elements 526, 527, 528. The fourth possible Y ideal value 510 is subtracted from received Y samples 502 in row 506 using adder 529, with the resulting different squared in multiplier 530 to yield Euclidean distance 531. The Euclidean distance 531 for the fourth possible Y ideal value 510 is sequentially delayed in delay elements 532, 533, 534.

The Euclidean distances may be computed in parallel and delayed repeatedly to produce all the distance measurements needed for Equation 1, and the results are added together based on the servo address mark patterns 540, 541 being searched for, using multiplexers 542, 543, 544, 545, 546, 547. This enables the adaptive servo address mark detector 500 to search for multiple servo address mark patterns 540, 541 simultaneously without duplicating the entire detector, in contrast to a Hamming servo address mark detector which only searches for one pattern. In the adaptive servo address mark detector 500, the servo address mark patterns 540, 541 control the series of multiplexers 542, 543, 544, 545, 546, 547 to select the appropriate one of the four possible distances at each delay point. Adders 550, 551 add the resulting outputs of the multiplexers 542, 543, 544, 545, 546, 547 to produce servo address mark metrics 552, 553 respectively.

Each servo address mark metric 552, 553 is compared against the threshold 554 provided by a threshold adaptation circuit 555 in threshold comparators 556, 557. If servo address mark metric 552 based on servo address mark 1 540 is greater than threshold 554, the servo address mark 1 found signal 560 is asserted. If servo address mark metric 553 based on servo address mark 2 541 is greater than threshold 554, the servo address mark 2 found signal 562 is asserted.

A numeric example is set forth below to illustrate the Euclidean distance calculation in some embodiments. In table 1 below, each row contains one of the Y ideal values 507, 508, 509, 510, each row corresponding to the 2-bit transition noted:

TABLE 1

| Transition | Y Ideals | | | |
|---|---|---|---|---|
| 00 | 0 | 80 | 0 | −80 |
| 01 | −88 | 0 | 88 | 108 |
| 10 | 88 | 0 | −88 | −108 |
| 11 | 0 | −80 | 0 | 80 |

The transitions are state changes in the source data or raw data from which the received Y samples and Y ideals are derived. Thus, in some embodiments, the source data and the Y samples and Y ideals have different formats, with the Y samples and Y ideals being encoded versions of the source data. In some embodiments, source data is encoded using wide bi phase code before writing to the storage medium. For example, servo address mark pattern "001" may be encoded in some embodiments to "1100 1100 0011" using wide bi phase code, so that each source data bit results in 4 received Y samples or Y ideals. As a simple example, the encoded servo address mark may be pre-padded with a preamble such as "0011 0011" and may have Gray data such as "0011" appended to form a write data stream of " . . . 0011 0011 1100 1100 0011 0011 . . . ". During readback, the continuous time signal is sensed by the read/write head, and an analog to digital converter produces 24 digitized samples that correspond to the 24 channel bits that were written. The 24 digitized samples corresponding to the example write data stream above may be, for example, 6 −73 7 83 94 1 −81 −108 2 80 0 −72 −82 3 97 108 4 −77 7 87 1 −76 4 86 in the received Y samples.

Given a servo address mark pattern of 001 for servo address mark 1 540, the corresponding Y ideal sequence is 88 0 −88 −108 0 80 0 −80 −88 0 88 108, which are the Y ideal values from Table 1 for transitions 10 (row 3), 00 (row 1), and 01 (row 2). The first transition of 10 is selected if the bit immediately preceding the servo address mark pattern is a 1, which is the case whether the preceding data comes from the repeating preamble or a previous repetition of the servo address mark pattern. The adaptive servo address mark detector 500 thus searches for the pattern 88 0 −88 −108 0 80 0 −80 −88 0 88 108 in the received Y samples, given a servo address mark pattern of 001 for servo address mark 1 540, given this numeric example and the 4-bit Y samples resulting from wide bi-phase encoding. Again, the adaptive servo address mark detection is not limited to this data format or to this numeric example.

Given a servo address mark pattern of 0101 for servo address mark 2 541, the corresponding Y ideal sequence is 88 0 −88 −108 −88 0 88 108 88 0 −88 −108 −88 0 88 108, which are the Y ideal values from Table 1 for transitions 10 (row 3), 01 (row 2), 10 (row 3) and 01 (row 2). The first transition of 10 is selected if the bit immediately preceding the servo address mark pattern is a 1, which is the case whether the preceding data comes from the repeating preamble or a previous repetition of the servo address mark pattern. The adaptive servo address mark detector 500 thus searches for the pattern 88 0 −88 −108 −88 0 88 108 88 0 −88 −108 −88 0 88 108 in the received Y samples, given a servo address mark pattern of 0101 for servo address mark 2 541.

Assume, for example, that adaptive servo address mark detector 500 receives the following received Y samples: 6 −73 7 83 94 1 −81 −108 2 80 0 −72 −82 3 97 108 4 −77 7 87 1 −76 4 86. Notably, there are more received Y samples than Y ideals, and the adaptive servo address mark detector 500 processes a run of the received Y samples having the same length as the Y ideals. The difference and squaring operations performed in the adders (e.g., 511) and multipliers (e.g., 512) may be performed in any suitable manner, for example by accumulating enough received Y samples to match the length of the Y ideals and then subtracting, squaring and accumulating the result in one parallel operation, or by performing difference, squaring and accumulating operations piece by piece as Y samples are received. Based on the disclosure herein, one of ordinary skill in the art will recognize a variety of techniques or circuits that may be used to implement Equation 1 and to process incoming received Y samples in relation to different embodiments of the present inventions. The Euclidean distance and servo address mark metric computation may be viewed as moving the Y ideal window over the received Y samples, performing one calculation every 4T and moving the window 4T (or four samples) at a time. The computation is thus performed at modulus 4 time instances in some embodiments.

At time T, the Euclidean distance calculation given a servo address mark pattern of 001 for servo address mark 1 540 is:

TABLE 2

| | T | | | | T + 4 | | | | T + 8 | | | |
|---|---|---|---|---|---|---|---|---|---|---|---|---|
| Received Y samples | 6 | −73 | 7 | 83 | 94 | 1 | −81 | −108 | 2 | 80 | 0 | −72 |
| Y ideals | 88 | 0 | −88 | −108 | 0 | 80 | 0 | −80 | −88 | 0 | 88 | 108 |
| Δ | −82 | −73 | 95 | 191 | 94 | −79 | −81 | −28 | 90 | 80 | −88 | −180 |
| Δ^2 | 6724 | 5329 | 9025 | 36481 | 8836 | 6241 | 6561 | 784 | 8100 | 6400 | 7744 | 32400 |

The sum of the squared differences beginning at time T is 134625. When the window is shifted to time T+4, the Euclidean distance calculation is:

TABLE 3

| | T + 4 | | | | T + 8 | | | | T + 12 | | | |
|---|---|---|---|---|---|---|---|---|---|---|---|---|
| Received Y samples | 94 | 1 | −81 | −108 | 2 | 80 | 0 | −72 | −82 | 3 | 97 | 108 |
| Y ideals | 88 | 0 | −88 | −108 | 0 | 80 | 0 | −80 | −88 | 0 | 88 | 108 |
| Δ | 6 | 1 | 7 | 0 | 2 | 0 | 0 | 8 | 6 | 3 | 9 | 0 |
| Δ^2 | 36 | 1 | 49 | 0 | 4 | 0 | 0 | 64 | 36 | 9 | 81 | 0 |

The sum of the squared differences beginning at time T+4 is 280. When the window is shifted to time T+8, the Euclidean distance calculation is:

TABLE 4

| | T + 8 | | | | T + 12 | | | | T + 16 | | | |
|---|---|---|---|---|---|---|---|---|---|---|---|---|
| Received Y samples | 2 | 80 | 0 | −72 | −82 | 3 | 97 | 108 | 4 | −77 | 7 | 87 |
| Y ideals | 88 | 0 | −88 | −108 | 0 | 80 | 0 | −80 | −88 | 0 | 88 | 108 |
| Δ | −86 | 80 | 88 | 36 | −82 | −77 | 97 | 188 | 92 | −77 | −81 | −21 |
| Δ^2 | 7396 | 6400 | 7744 | 1296 | 6724 | 5929 | 9409 | 35344 | 8464 | 5929 | 6561 | 441 |

The sum of the squared differences beginning at time T+8 is 101637. When the window is shifted to time T+12, the Euclidean distance calculation is:

TABLE 5

| | T + 12 | | | | T + 16 | | | | | | | |
|---|---|---|---|---|---|---|---|---|---|---|---|---|
| Received Y samples | −82 | 3 | 97 | 108 | 4 | −77 | 7 | 87 | 1 | −76 | 4 | 86 |

TABLE 5-continued

|  | T + 12 |  |  |  |  | T + 16 |  |  |  |  |  |  |
| --- | --- | --- | --- | --- | --- | --- | --- | --- | --- | --- | --- | --- |
| Y ideals | 88 | 0 | −88 | −108 | 0 | 80 | 0 | −80 | −88 | 0 | 88 | 108 |
| Δ | −170 | 3 | 185 | 216 | 4 | −157 | 7 | 167 | 89 | −76 | −84 | −22 |
| Δ^2 | 28900 | 9 | 34225 | 46656 | 16 | 24649 | 49 | 27889 | 7921 | 5776 | 7056 | 484 |

The sum of the squared differences beginning at time T+12 is 183630. The Euclidean distances are thus 134625, 280, 101637 and 183630 calculated at times T, T+4, T+8 and T+12. If the threshold is larger than 280 but smaller than the next largest calculated Euclidean distance, the servo address mark 1 540 is detected at time T+4, asserting servo address mark 1 found signal 560 for that time period. The servo address mark 2 541 is calculated similarly, using multiplexers 545, 546, 547 to share the distance calculation circuits in rows 503, 503, 505, 506.

Figure 6:
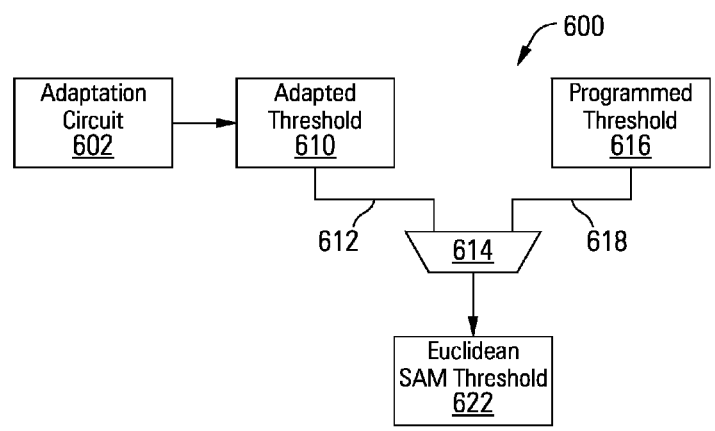
FIG. 6 is a block diagram of a Euclidean servo address mark detection threshold circuit in accordance with some embodiments of the present inventions.
Figure 7:
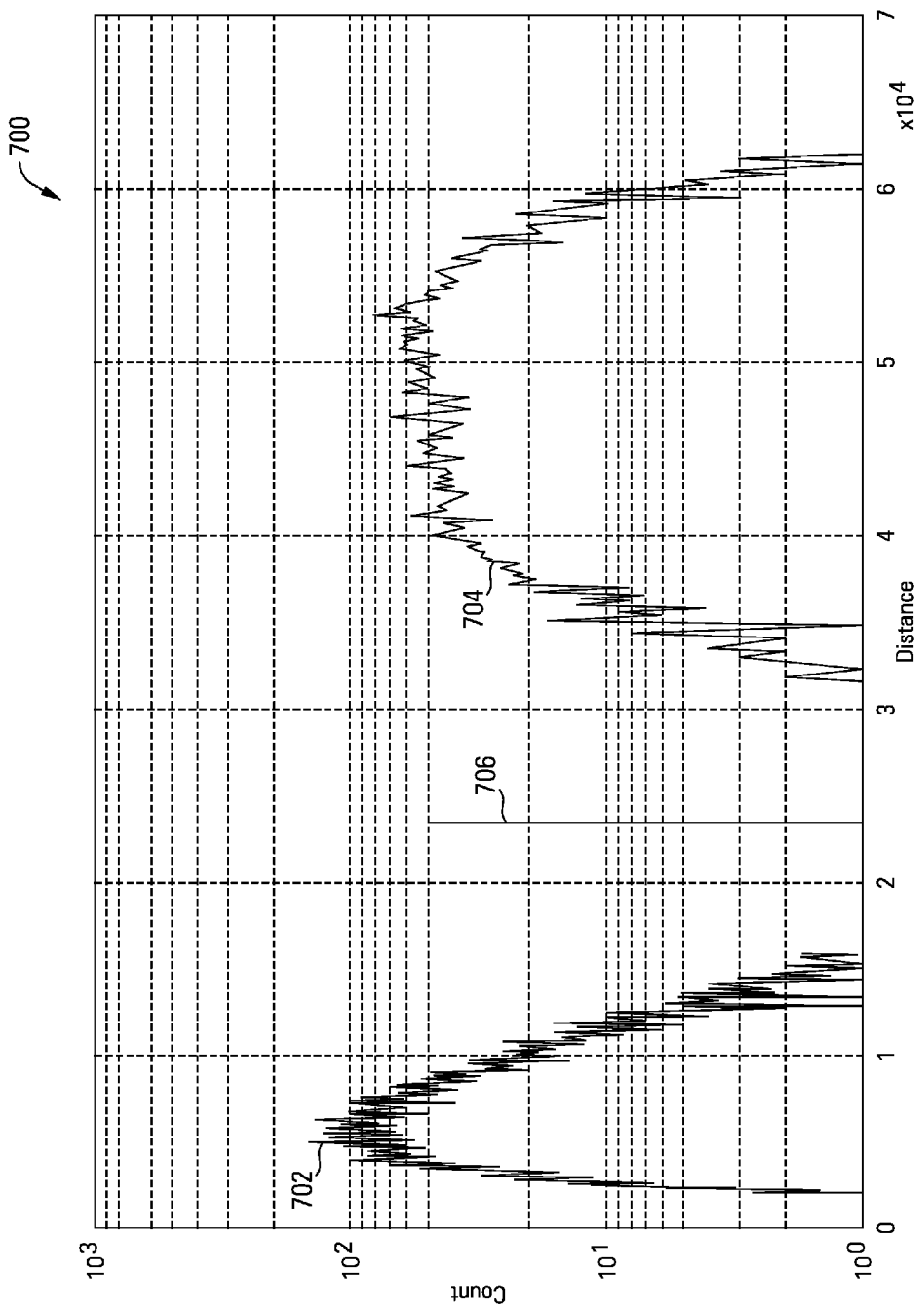
FIG. 7 is a graph showing Euclidean distance threshold determination based on Euclidean distance distributions for Y samples captured inside a servo address mark and for Y samples captured outside a servo address mark in accordance with some embodiments of the present inventions.

Turning to FIG. 6, a block diagram of a Euclidean servo address mark detection threshold circuit 600 is depicted in accordance with some embodiments of the present inventions. The Euclidean servo address mark detection threshold circuit 600 is suitable for use in some embodiments in place of the threshold adaptation circuit 555 of FIG. 5. In this embodiment, the Euclidean servo address mark detection threshold circuit 600 provides for selection between a programmed threshold 618 in a programmed threshold register 616 and an adapted threshold 612 in an adapted threshold register 610. An adaptation circuit 602 is provided in some embodiments to accumulate Euclidean distances calculated from Y samples captured inside a servo address mark and from Y samples captured outside a servo address mark, yielding two distance distributions. As shown in the plot 700 of FIG. 7, the distance distribution 702 for Y samples captured inside a servo address mark includes the range of calculated Euclidean distances between the Y ideals and the received Y samples from the servo address mark. The distance distribution 704 for Y samples captured outside a servo address mark, for example in the preamble of the servo data or in other servo data fields, includes the range of calculated Euclidean distances between the Y ideals and the received Y samples from outside the servo address mark. The distance distribution for Y samples captured inside a servo address mark should generally be much smaller than the distance distribution for Y samples captured outside a servo address mark, because the Euclidean distance between Y ideals and received Y samples captured inside a servo address mark should generally be 0 in the absence of any noise or servo data corruption, whereas the servo address mark should generally not be found in any data other than the servo address mark itself.

The adaptation circuit 602 identifies a threshold 706 between the two distance distributions 702 and 704 such that the servo address mark can be detected based on the Euclidean distances between the Y ideals and the received Y samples, without false detection of a servo address mark in other servo data outside the servo address mark. Where there is separation between the two distance distributions 702 and 704 as in FIG. 7, the threshold 706 may be placed midway between the distance distributions 702 and 704 or at any other location below the smallest distance of the distance distribution 704. If the threshold 706 is placed so that any of the calculated Euclidean distances between the Y ideals and the received Y samples from outside the servo address mark are below the threshold 706, in other words so that threshold 706 is within distance distribution 704, false detection of the servo mark may occur. In cases in which the two distance distributions 702 and 704 overlap, the threshold 706 may be placed within the distance distribution 702, below the smallest distance of the distance distribution 704 to prevent false detection, although in that case some servo address marks may not be detected where the highest distances within distance distribution 702 are greater than the threshold 706. Based upon the disclosure provided herein, one of ordinary skill in the art will recognize a variety of adaptation circuits that may be used in relation to different embodiments of the present inventions to place the threshold 706 to allow for the best possible detection of servo address marks while avoiding false detection. In some embodiments, the adaptation circuit 602 implements Equation 3 to produce an adapted threshold 612 and 706 based on the four largest Euclidean distances $SM_S$ collected from a number of servo wedges or servo events and calculated based on received Y samples inside a servo address mark, and on the four smallest Euclidean distances $SM_{NS}$ collected over those servo events and calculated based on received Y samples outside the servo address mark. Notably, Equation 3 is based on the use of four values, but is not limited to the use of four values.

$$\text{Threshold} = (SM_{S1} + SM_{NS1} + SM_{S2} + SM_{NS2} + SM_{S3} + SM_{NS3} + SM_{S4} + SM_{NS4})/8 \qquad (\text{Eq 3})$$

The threshold is thus calculated as the midpoint between the highest distance of distance distribution 702 for Y samples captured inside a servo address mark and the lowest distance of distance distribution 704 for Y samples captured outside a servo address mark, averaged over a number of servo events. In some embodiments, the largest Euclidean distances $SM_S$ collected from received Y samples inside a servo address mark and the smallest Euclidean distances $SM_{NS}$ collected from received Y samples outside a servo address mark are collected over hundreds or thousands of servo events. The threshold may also be adapted for comparison with a servo address mark metric that is the sum of a number of Euclidean distances by multiplying the threshold from Equation 3 by the number of Euclidean distances to be included within a sliding window when calculating the servo address mark metric.

Turning again to FIG. 6, the adaptation circuit 602 updates the adapted threshold stored in the adapted threshold register 610. This threshold adaptation process may be performed during manufacturing, or once during startup tests during operation of a storage device, periodically during operation, or continuously during operation each time a servo event occurs and servo data is read from a servo wedge. The adapted threshold 612 from the adapted threshold register 610 or the programmed threshold 618 from the programmed threshold register 616 may be selected using multiplexer 614, yielding a Euclidean servo address mark distance threshold 622 that is either adaptive or programmed. In other embodiments, the adaptive servo address mark detector may use just one of the adaptive or programmed Euclidean servo address mark distance threshold, omitting the other.

In some embodiments, the Y ideals are generated by event based training based on the servo channel output either from the interpolator (e.g., 220, 320), if included, or other signal source within the servo channel. Servo address mark patterns are used which include all possible transitions. For example, the pattern "000110010" would be a suitable servo address mark pattern in terms of expected channel output training for the embodiments disclosed above because it includes all four possible transitions 00, 01, 10 and 11. In contrast, the pattern "000101001" would not because it excludes the transition 11. In other embodiments, other servo channel data fields such as a Gray field may be used in event based training. In the event based training, the servo channel output is collected or accumulated for each of the four possible transitions over a number of servo events. For each different transition pattern the servo channel output may look different, and the servo channel output for each of the transition patterns is collected and averaged to yield an estimation of the Y ideals, according to Equation 4:

$$YE\_ACCUM_{PatternNum\_0} += Y[i][0]$$

$$YE\_ACCUM_{PatternNum\_1} += Y[i][1]$$

$$YE\_ACCUM_{PatternNum\_2} += Y[i][2]$$

$$YE\_ACCUM_{PatternNum\_3} += Y[i][3] \quad (Eq\ 4)$$

where YE_ACCUM is the accumulated servo channel output, PatternNum is one of the possible transition patterns, for example 00, 01, 10 or 11, and I[i][j] is the servo channel output used to drive the event based training of the Y ideals. The equations of Equation 4 are duplicated for each of the possible transition patterns.

The number of servo events over which the servo channel output is accumulated for each possible transition pattern is fixed in some embodiments, and is user programmable in other embodiments. The servo channel output for each of the possible transition patterns may accumulate at different rates depending on the servo data patterns. In some embodiments, the expected channel output or Y ideal for a particular transition pattern is updated as soon as the servo channel output is accumulated for N occurrences of that particular transition pattern, so that the Y ideals for different transition patterns are updated at different rates. In other embodiments, all Y ideals are updated after the servo channel output has been accumulated for N of each of the transition patterns, using only the N most recent servo channel outputs to produce the Y ideals for each possible transition pattern. The expected Y values or Y ideals for one possible transition pattern are calculated by averaging the accumulated servo channel outputs according to Equation 5:

$$YE_{PatternNum\_0} = \frac{YE\_ACCUM_{PatternNum\_0}}{N} \quad (Eq\ 5)$$

$$YE_{PatternNum\_1} = \frac{YE\_ACCUM_{PatternNum\_1}}{N}$$

$$YE_{PatternNum\_2} = \frac{YE\_ACCUM_{PatternNum\_2}}{N}$$

$$YE_{PatternNum\_3} = \frac{YE\_ACCUM_{PatternNum\_3}}{N}$$

where YE is the trained Y value or Y ideal, PatternNum is one of the possible transition patterns, for example 00, 01, 10 or 11, N is the number of accumulated servo channel outputs over which the expected Y values are averaged, and where the equations of Equation 5 are calculated for each of the possible transition patterns.

The event based training of Y ideals according to Equations 4 and 5 may be performed during operation, either continuously or periodically, to quickly adapt to fast changing servo channel profiles, such as when moving from one servo wedge to another.

Globally averaged Y ideals may also be produced, for example during manufacturing of a storage system, by averaging periodically sampled servo channel output estimates from the event based training for each possible transition pattern. The step size period, K, over which a sample is collected, or the number of servo events to skip between samples, may be fixed or user programmable. The periodically sampled servo channel output estimates are accumulated according to Equation 6:

$$YG\_ACCUM_{PatternNum\_0} += SRV\_VIT\_YA_{PatternNum\_0}$$

$$YG\_ACCUM_{PatternNum\_1} += SRV\_VIT\_YA_{PatternNum\_1}$$

$$YG\_ACCUM_{PatternNum\_2} += SRV\_VIT\_YA_{PatternNum\_2}$$

$$YG\_ACCUM_{PatternNum\_3} += SRV\_VIT\_YA_{PatternNum\_3} \quad (Eq\ 6)$$

where YG_ACCUM is the accumulated periodically sampled servo channel output estimate, PatternNum is one of the possible transition patterns, for example 00, 01, 10 or 11, SRV_VIT_YA are the periodically sampled channel output estimates and where the equations of Equation 6 are duplicated for each of the possible transition patterns. The period M, i.e., the total number of servo events over which the global averaging is performed, may also be fixed or user programmable. The averaging of periodically sampled channel output estimates may be performed according to Equation 7:

$$YG_{PatternNum\_0} = YG\_ACCUM_{PatternNum\_0}/(M/K)$$

$$YG_{PatternNum\_1} = YG\_ACCUM_{PatternNum\_1}/(M/K)$$

$$YG_{PatternNum\_2} = YG\_ACCUM_{PatternNum\_2}/(M/K)$$

$$YG_{PatternNum\_3} = YG\_ACCUM_{PatternNum\_3}/(M/K) \quad (7)$$

where YG are the globally averaged Y ideals, YG_ACCUM is the accumulated periodically sampled servo channel output estimate, M establishes the global averaging period, PatternNum is one of the possible transition patterns, for example 00, 01, 10 or 11, and where the equations of Equation 7 are duplicated for each of the possible transition patterns.

Using Y ideals generated by event based training with global averaging adapts the servo address mark detection to overall servo channel conditions, filtering out the rapid disturbances that may result from localized servo channel conditions. For example, in a zoned disk system with varying channel densities as a function of track radius the globally averaged Y ideals are trained based on all zones and can be used as the starting point for Y ideals at any location on the disk platter, whereas the Y ideals generated by event based training without global averaging will quickly adapt to the local zone channel density during operation to be used in place of the default globally averaged Y ideals.

Turning to FIG. 8, a flow diagram 800 depicts a method for adaptive servo address mark detection in accordance with various embodiments of the present inventions. Flow diagram 800 shows the method of adaptive servo address mark detection that may be performed by circuits such as those disclosed in FIGS. 2-7. Following flow diagram 800, a received Y sample is obtained from the servo channel. (Block 802) The Euclidean distance is calculated between the received Y sample and a Y ideal. (Block 804) In some embodiments, the Euclidean distance may be calculated set forth in Equation 1. The Euclidean distances within a sliding window are summed to yield a servo address mark metric. (Block 806) In some embodiments, this is performed according to Equation 2. A determination is made as to whether the servo address mark metric is lower than a threshold. (Block 810) If so, the servo address mark has been detected in the received Y sample. (Block 812)

Turning to FIG. 9, a flow diagram 900 depicts a method for generating adaptive Y ideals in accordance with some embodiments of the present inventions. Following flow diagram 900, the servo channel output for each transition pattern is accumulated from a servo channel field containing all possible transitions. (Block 902) In some embodiments where the servo address mark pattern contains all possible transitions, such as 00, 01, 10 and 11 in a two state system, the servo channel output for those transition patterns may be accumulated from the servo address mark servo channel data. In other embodiments, the servo channel output corresponding to the possible transition patterns may be accumulated from other servo channel fields containing all possible transitions. The accumulated servo channel output is averaged to yield a Y average for each possible transition pattern. (Block 904) A determination is made as to whether the Y averages are available for all possible transitions. (Block 906) In some embodiments, this involves determining whether a certain number of servo channel outputs have been accumulated for each transition pattern. In other embodiments where Y averages are continuously updated, this involves determining whether new Y averages are available for all possible transitions, based on a certain number of servo channel outputs for each possible transition pattern. The Y ideals are updated from the Y averages. (Block 910)

Turning to FIG. 10, a flow diagram 1000 depicts a method for adapting a Euclidean distance threshold in accordance with some embodiments of the present inventions. Following flow diagram 1000, the lowest Euclidean distances are accumulated from the distance distribution for received Y samples from outside the servo address mark. (Block 1002) The highest Euclidean distances are accumulated from the distance distribution for received Y samples from inside the servo address mark. (Block 1004) A determination is made as to whether the distance distributions overlap. (Block 1006) If not, the Euclidean distance threshold is set at the average of the accumulated lowest and highest Euclidean distances. (Block 1010) If so, the Euclidean distance threshold is set within the distance distribution for received Y samples from inside the servo address mark and below the lowest Euclidean distance for received Y samples from outside the servo address mark. (Block 1012)

Figure 11:
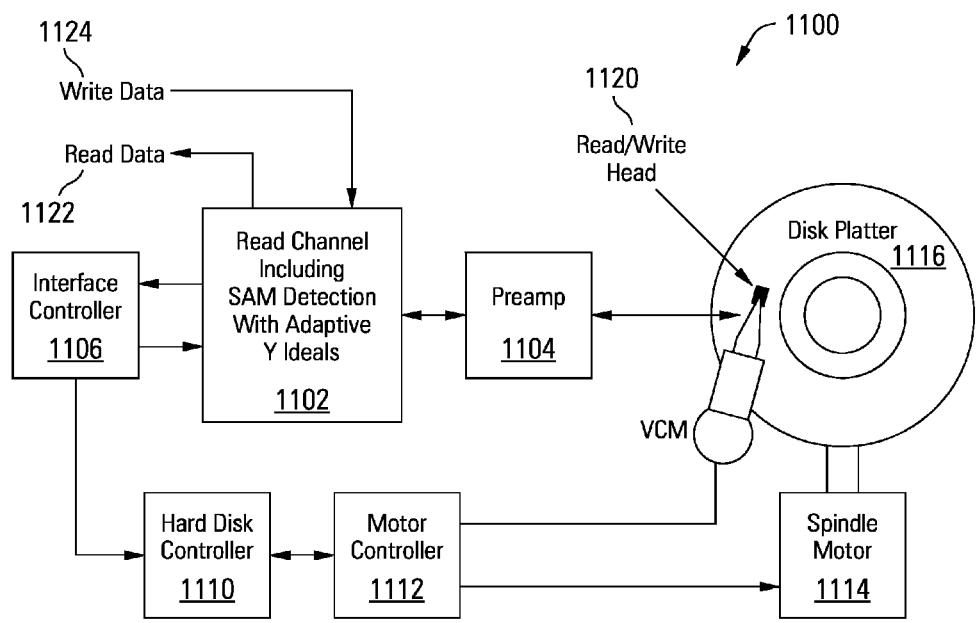
FIG. 11 depicts a data storage system including a servo channel with adaptive servo address mark detection in accordance with some embodiments of the present inventions.

Turning to FIG. 11, a storage system 1100 with a read channel 1102 including adaptive servo address mark detection in accordance with some embodiments of the present inventions. Storage system 1100 may be, for example, a hard disk drive. Storage system 1100 also includes a preamplifier 1104, an interface controller 1106, a hard disk controller 1110, a motor controller 1112, a spindle motor 1114, a disk platter 1116, and a read/write head assembly 1120. Interface controller 1106 controls addressing and timing of data to/from disk platter 1116. The data on disk platter 1116 consists of groups of magnetic signals that may be detected by read/write head assembly 1120 when the assembly is properly positioned over disk platter 1116. In one embodiment, disk platter 1116 includes magnetic signals recorded in accordance with either a longitudinal or a perpendicular recording scheme.

In a typical read operation, read/write head assembly 1120 is accurately positioned by motor controller 1112 over a desired data track on disk platter 1116. Motor controller 1112 both positions read/write head assembly 1120 in relation to disk platter 1116 and drives spindle motor 1114 by moving read/write head assembly 1120 to the proper data track on disk platter 1116 under the direction of hard disk controller 1110. Spindle motor 1114 spins disk platter 1116 at a determined spin rate (RPMs). Once read/write head assembly 1120 is positioned adjacent the proper data track, magnetic signals representing data on disk platter 1116 are sensed by read/write head assembly 1120 as disk platter 1116 is rotated by spindle motor 1114. The sensed magnetic signals are provided as a continuous, minute analog signal representative of the magnetic data on disk platter 1116. This minute analog signal is transferred from read/write head assembly 1120 to read channel circuit 1102 via preamplifier 1104. Preamplifier 1104 is operable to amplify the minute analog signals accessed from disk platter 1116. In turn, read channel circuit 1102 decodes and digitizes the received analog signal to recreate the information originally written to disk platter 1116. This data is provided as read data 1122 to a receiving circuit. During operation, the read channel circuit 1102 with adaptive servo address mark detection detects servo address marks in the course of positioning the read/write head 1120 over the disk platter 1116. Such adaptive servo address mark detection may be implemented consistent with the disclosure above in relation to FIGS. 2-7. In some cases, the adaptive servo address mark detection may be performed consistent with the flow diagrams disclosed above in relation to FIGS. 8-10. A write operation is substantially the opposite of a read operation with write data 1124 being provided to read channel circuit 1102 and written to disk platter 1116.

It should be noted that storage system 1100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 1100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

It should be noted that the various blocks discussed in the above application may be implemented in integrated circuits along with other functionality. Such integrated circuits may include all of the functions of a given block, system or circuit, or a portion of the functions of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel apparatuses, systems, and methods for adaptive servo address mark detection. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for detecting a servo address mark comprising:
   a Euclidean distance calculator operable to calculate a Euclidean distance between a received data sample from a data stream and an ideal data sample for the servo address mark;
   an accumulator operable to accumulate the Euclidean distance over a sliding window across the data stream to yield an accumulated Euclidean distance;
   a threshold comparator operable to determine that the servo address mark has been detected when the accumulated Euclidean distance is less than a threshold; and
   a threshold adaptation circuit operable to generate the threshold based on a plurality of received data samples taken from within the servo address mark and on a second plurality of received data samples taken from outside the servo address mark.

2. The apparatus of claim 1, wherein the Euclidean distance is calculated in a multi-dimensional space with axes defined by an adaptation process used to generate the ideal data sample.

3. The apparatus of claim 1, wherein the Euclidean distance calculator comprises an adder and a multiplier to yield a distance value for each of a plurality of transition patterns in source data from which the ideal data sample is derived, operable to subtract the ideal data sample for a corresponding one of the plurality of transition patterns from the received data sample and to square a result.

4. The apparatus of claim 3, wherein the Euclidean distance calculator further comprises a plurality of delay circuits operable to delay a result of each of the multipliers to yield a plurality of increasingly delayed Euclidean distances within the sliding window.

5. The apparatus of claim 4, wherein the Euclidean distance calculator further comprises a plurality of multiplexers for each servo address mark being detected, wherein each of the plurality of multiplexers is operable to select between the distance values for each of the plurality of transition patterns, and wherein each of the plurality of multiplexers operates on the distance values for a different time delay.

6. The apparatus of claim 5, wherein the plurality of multiplexers are controlled by bits of the servo address mark.

7. The apparatus of claim 5, wherein the accumulator is operable to add an output from each of the plurality of multiplexers.

8. The apparatus of claim 5, wherein the apparatus is operable to detect a plurality of different servo address marks, each being detected by a different plurality of multiplexers and sharing the adders and multipliers.

9. The apparatus of claim 1, wherein the threshold adaptation circuit is operable to place the threshold at a distance value below distance values for the second plurality of received data samples taken from outside the servo address mark and above distance values for at least some of the plurality of received data samples taken from within the servo address mark.

10. The apparatus of claim 1, further comprising an ideal data sample generator operable to generate the ideal data sample by averaging the received data samples for each of a plurality of transition patterns in source data from which the received data samples are derived.

11. The apparatus of claim 10, wherein the ideal data sample generator is further operable to generate globally averaged data samples, wherein the received data samples are sampled from the data stream at periodic intervals.

12. The apparatus of claim 1, further comprising a DC content removal circuit operable to estimate local DC content by averaging the received data samples within a DC content sliding window and to subtract the local DC content from the received data sample used to calculate the Euclidean distance.

13. The apparatus of claim 1, wherein the apparatus is implemented as an integrated circuit.

14. The apparatus of claim 1, wherein the apparatus is incorporated in a storage device.

15. The apparatus of claim 1, wherein the apparatus is incorporated in a storage system comprising a redundant array of independent disks.

16. A method for detecting a servo address mark, comprising:
   generating an ideal data sample for the servo address mark by averaging data samples corresponding to each of a plurality of transition patterns in source data from which the data samples are derived;
   calculating a Euclidean distance between a received data sample from the data stream and the ideal data sample;
   accumulating the Euclidean distance over a sliding window across the data stream to yield an accumulated Euclidean distance;
   identifying the servo address mark as detected when the accumulated Euclidean distance is less than a threshold; and
   positioning a sensor in relation to a storage medium based at least in part on the servo address mark.

17. The method of claim 16, further comprising setting the threshold based on a plurality of the data samples taken from within the servo address mark and on a second plurality of the data samples taken from outside the servo address mark.

18. The method of claim 17, further comprising placing the threshold at a distance value below distance values for the second plurality of received data samples taken from outside the servo address mark and above distance values for at least some of the plurality of received data samples taken from within the servo address mark.

19. A storage system comprising:
   a storage medium maintaining a data set;
   a read/write head assembly operable to sense the data set on the storage medium and to provide an analog output corresponding to the data set;
   an analog to digital converter operable to sample a continuous signal to yield a digital output; and
   an apparatus for detecting a servo address mark in the digital output comprising:
      a Euclidean distance calculator operable to calculate a Euclidean distance between a data sample from the digital output and an ideal data sample for the servo address mark, wherein the Euclidean distance calculator comprises an adder and a multiplier to yield a distance value for each of a plurality of transition patterns in source data from which the ideal data sample is derived, operable to subtract the ideal data sample for a corresponding one of the plurality of transition patterns from the received data sample and to square a result;

an accumulator operable to accumulate the Euclidean distance over a sliding window across the data stream to yield an accumulated Euclidean distance; and a threshold comparator operable to determine that the servo address mark has been detected when the accumulated Euclidean distance is less than a threshold.

20. The apparatus of claim 19, the apparatus for detecting the servo address mark in the digital output comprising a threshold adaptation circuit operable to generate the threshold based on a plurality of received data samples taken from within the servo address mark and on a second plurality of received data samples taken from outside the servo address mark.

* * * * *